United States Patent
Hu et al.

(10) Patent No.: US 11,177,542 B2
(45) Date of Patent: Nov. 16, 2021

(54) SECONDARY BATTERY AND BATTERY MODULE

(71) Applicant: Contemporary Amperex Technology Co., Limited, Ningde (CN)

(72) Inventors: Fei Hu, Ningde (CN); Haizu Jin, Ningde (CN); Dongyang Shi, Ningde (CN); Zhenhua Li, Ningde (CN); Ning Chen, Ningde (CN); Yuanbao Chen, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 331 days.

(21) Appl. No.: 16/424,048

(22) Filed: May 28, 2019

(65) Prior Publication Data

US 2020/0212411 A1     Jul. 2, 2020

(30) Foreign Application Priority Data

Dec. 29, 2018   (CN) .......................... 201811646276.1

(51) Int. Cl.
*H01M 2/26*        (2006.01)
*H01M 10/0587*     (2010.01)
(Continued)

(52) U.S. Cl.
CPC ....... *H01M 50/54* (2021.01); *H01M 10/0431* (2013.01); *H01M 10/0481* (2013.01);
(Continued)

(58) Field of Classification Search
CPC combination set(s) only.
See application file for complete search history.

(56) References Cited

U.S. PATENT DOCUMENTS

| 2003/0031920 A1 | 2/2003 | Hoffman et al. |
| 2005/0136325 A1* | 6/2005 | Fujihara ............ H01M 50/155 429/176 |
| 2016/0093845 A1* | 3/2016 | DeKeuster ........... H01M 4/505 429/99 |

FOREIGN PATENT DOCUMENTS

| CN | 204905338 U | 12/2015 |
| CN | 205376665 U | 7/2016 |

(Continued)

OTHER PUBLICATIONS

The extended European search report for European Application No. 19179981.6, dated Jan. 29, 2020, 7 pages.
(Continued)

*Primary Examiner* — Kaity V Chandler
(74) *Attorney, Agent, or Firm* — Law Offices of Liaoteng Wang

(57) ABSTRACT

The present disclosure relates to a secondary battery and a battery module. The secondary battery comprises a case, comprising a base plate and a side plate connected with the base plate, wherein the base plate and the side plate form a receiving hole and an opening in communication with the receiving hole, the opening is arranged opposite to the base plate in an axial direction of the receiving hole, and the base plate has a thickness larger than that of the side plate; a cap assembly, sealingly connected with the side plate to close the opening; and an electrode assembly, disposed in the receiving hole and comprising two or more electrode units, which are stacked in the axial direction, and each electrode unit is arranged with a wide side opposite to the base plate and a narrow side toward the side plate.

17 Claims, 7 Drawing Sheets

(51) Int. Cl.
*H01M 10/04* (2006.01)
*H01M 2/04* (2006.01)
*H01M 2/10* (2006.01)
*H01M 50/54* (2021.01)
*H01M 50/20* (2021.01)
*H01M 50/147* (2021.01)

(52) U.S. Cl.
CPC ..... *H01M 10/0587* (2013.01); *H01M 50/147* (2021.01); *H01M 50/20* (2021.01); *H01M 2220/20* (2013.01)

(56) References Cited

FOREIGN PATENT DOCUMENTS

| | | | | |
|---|---|---|---|---|
| CN | 205406578 U | | 7/2016 | |
| CN | 107004784 A | | 8/2017 | |
| CN | 109565088 | * | 4/2019 | .......... H01M 10/486 |
| JP | 2007073317 A | | 3/2007 | |
| JP | 2010108794 A | | 5/2010 | |
| WO | WO 2011145205 | * | 11/2011 | ............ H01M 10/36 |

OTHER PUBLICATIONS

PCT International Search Report for PCT/CN2019/119940, dated Feb. 6, 2020, 10 pages.

* cited by examiner

SECONDARY BATTERY AND BATTERY MODULE

CROSS REFERENCE TO RELATED APPLICATION

This application claims priority to Chinese Patent Application No. 201811646276.1, filed on Dec. 29, 2018, which is hereby incorporated by reference in its entirety.

TECHNICAL FIELD

The present disclosure relates to a technical filed of battery, and particularly relates to a secondary battery and a battery module.

BACKGROUND

With the development of technology, applications of secondary batteries are becoming more and more extensive, involving production or life. The secondary battery is also called as a power battery and is a rechargeable battery. The secondary batteries with a low capacity can be used for a small electric vehicle, while the secondary batteries with a high capacity can be used for a large electric vehicle such as a hybrid vehicle or an electric vehicle. In the case that the secondary batteries are used in a group, a busbar is necessary to connect the secondary batteries in series or in parallel. In generally, the busbar is welded to positive electrodes and negative electrodes of the secondary batteries. A battery module includes a plurality of secondary batteries and connecting members for fixing the plurality of secondary batteries.

A secondary battery mainly includes a case, an electrode assembly, a current collecting member and a cap assembly, wherein the electrode assembly is formed by winding or stacking a positive electrode plate, a negative electrode plate and a separator. In prior art, the electrode assembly included in the secondary battery may expand in some cases, and thus may release a large expansion force to outside.

Since the plurality of secondary batteries included in the battery module are arranged side by side in one direction and the expansion force released by the electrode assembly is oriented in the arrangement direction of the secondary batteries, a relatively large combined force may be generated due to superimposition of the expansion forces released by the electrode assemblies included in the plurality of secondary batteries. This not only will cause deterioration of electrical performance of the secondary battery, but also requires the connecting members to have a high structural strength to restrain and offset the expansion force, which needs to increase a volume of the connecting member, and in turn will reduce energy density and space utilization of the secondary battery.

SUMMARY

The embodiments of the present disclosure provide a secondary battery and a battery module, wherein the secondary battery has a relatively small expansion amount in its thickness direction, and thus when grouped into a battery module, the secondary batteries have a relatively low requirement on rigidity and strength of external fixing members, which is conducive to increase energy density.

On one aspect, the embodiments of the present disclosure provides a secondary battery, comprising: a case, comprising a base plate and a side plate connected with the base plate, wherein the base plate and the side plate form a receiving hole and an opening in communication with the receiving hole, the opening is arranged opposite to the base plate in an axial direction of the receiving hole, and the base plate has a thickness larger than that of the side plate; a cap assembly, sealingly connected with the side plate to close the opening; and an electrode assembly, disposed in the receiving hole and comprising two or more electrode units, wherein the electrode unit comprises a first electrode plate, a second electrode plate and a separator, and has a wide side and a narrow side, the two or more electrode units are stacked in the axial direction, and each electrode unit is arranged with the wide side opposite to the base plate and the narrow side toward the side plate.

According to one aspect of the embodiments of the present disclosure, a ratio of a width of the wide side to the thickness of the base plate is equal to or greater than 20 and equal to or less than 69.

According to one aspect of the embodiments of the present disclosure, the width of the wide side is in a range of 40 mm to 60 mm, and the thickness of the base plate is in a range of 0.87 mm to 1.8 mm.

According to one aspect of the embodiments of the present disclosure, the thickness of the base plate is positively correlated with a height of the electrode assembly.

According to one aspect of the embodiments of the present disclosure, the first electrode plates in adjacent two layers have a first gap corresponding to the narrow side and a second gap corresponding to the wide side, and a dimension of the first gap is greater than that of the second gap.

According to one aspect of the embodiments of the present disclosure, the first electrode plates in adjacent two layers have a first gap corresponding to the narrow side, and the first gap has a dimension of 5 μm to 50 μm.

According to one aspect of the embodiments of the present disclosure, the side plate comprises two first plates disposed opposite to each other in a thickness direction of the secondary battery and two second plates for connecting the two first plates, wherein the first plate is disposed corresponding to the narrow side, the second plate is disposed corresponding to a winding end face of the electrode unit, and the first plate has a thickness smaller than that of the second plate.

According to one aspect of the embodiments of the present disclosure, a third gap is provided between the narrow side and the first plate, and the third gap has a dimension of 0.3 mm to 0.9 mm.

According to one aspect of the embodiments of the present disclosure, a fourth gap is provided between the winding end face and the second plate, and the fourth gap has a dimension of 0.3 mm to 0.9 mm.

According to one aspect of the embodiments of the present disclosure, the cap assembly and the electrode assembly are spaced apart to form a first buffer gap, which is adapted to provide a buffer for expansion deformation of the electrode assembly.

According to one aspect of the embodiments of the present disclosure, the first buffer gap has a height of 0.5 mm to 12 mm.

According to one aspect of the embodiments of the present disclosure, in the axial direction, a ratio of the height of the first buffer gap to a height of the electrode assembly is in a range of 0.05 to 0.3.

According to one aspect of the embodiments of the present disclosure, the base plate and the electrode assembly are spaced apart to form a second buffer gap, which is adapted to provide a buffer for expansion deformation of the electrode assembly.

The secondary battery according to the embodiments of the present disclosure includes a case having a receiving hole, and an electrode assembly disposed in the receiving hole. When the electrode unit of the present embodiments expands, it mainly expands in an axial direction of the receiving hole, and thus it will release an expansion force in the axial direction of the receiving hole, with a relatively small expansion force released in a thickness direction. As a result, the electrode unit will not exert an excessive compressive force on the side plate of the case. In view of this, when two or more secondary batteries of the present embodiment are arranged side by side in their thickness direction and assembled into a battery module, the main expansion force generated by each secondary battery when expanding will not accumulate and thus generate a relatively large combined force in the thickness direction, since the main expansion force generated by each secondary battery intersects with the thickness direction. When using an external fixing member to fix the battery module including two or more secondary batteries of the present embodiment, a relatively low requirement on the rigidity and strength of the fixing member is needed, which is conducive to reduce a volume or weight of the fixing member, thereby facilitating to improve the energy density and space utilization of the secondary battery and the entire battery module.

According to a further aspect, the embodiments of the present disclosure provide a battery module, comprising two or more secondary batteries according to the above-described secondary batteries, wherein the two or more secondary batteries are arranged side by side.

According to one aspect of the embodiments of the present disclosure, wherein a ratio of a width of the wide side to the thickness of the base plate is equal to or greater than 20 and equal to or less than 69.

According to one aspect of the embodiments of the present disclosure, the first electrode plates in adjacent two layers have a first gap corresponding to the narrow side and a second gap corresponding to the wide side, and a dimension of the first gap is greater than that of the second gap.

According to one aspect of the embodiments of the present disclosure, the first electrode plates in adjacent two layers have a first gap corresponding to the narrow side, and the first gap has a dimension of 5 µm to 50 µm.

According to one aspect of the embodiments of the present disclosure, the side plate comprises two first plates disposed opposite to each other in a thickness direction of the secondary battery and two second plates for connecting the two first plates, wherein the first plate is disposed corresponding to the narrow side, the second plate is disposed corresponding to a winding end face of the electrode unit, and the first plate has a thickness smaller than that of the second plate.

According to one aspect of the embodiments of the present disclosure, the cap assembly and the electrode assembly are spaced apart to form a first buffer gap, which is adapted to provide a buffer for expansion deformation of the electrode assembly.

BRIEF DESCRIPTION OF THE DRAWINGS

Features, advantages, and technical effects of exemplary embodiments of the present disclosure will be described below with reference to accompanying drawings.

Figure 1:
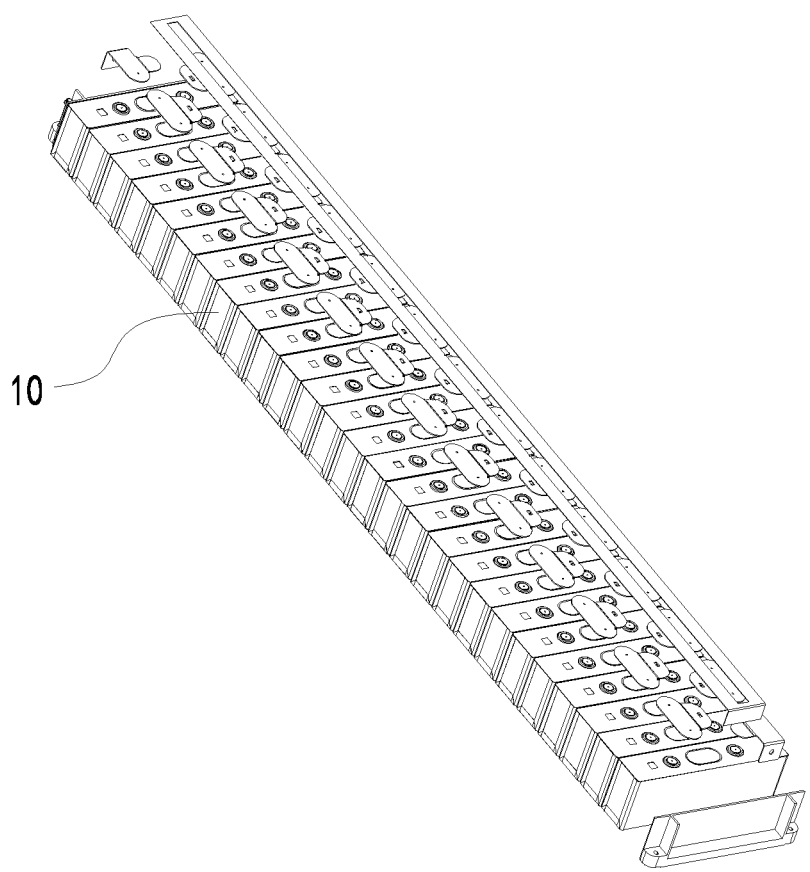
FIG. 1 is a schematic diagram showing a configuration of a battery module according to an embodiment of the present disclosure.

The above drawings are not drawn to scale.

REFERENCE NUMERALS 10, secondary battery;
11, case; 11a, receiving hole; 111, base plate; 112, side plate; 112a, first plate; 112b, second plate;
12, electrode assembly; 121, electrode unit; 12a, first electrode plate; 12b, second electrode plate; 12c, separator; 12d, first gap; 12e, second gap; 12f, third gap; 12g, fourth gap; 121a, wide side; 121b, narrow side; 121c, winding end face;
13, cap assembly; 131, cap plate; 132, electrode terminal;
14, first buffer gap;
15, second buffer gap;
20, battery module;
X, width direction; Y, thickness direction; Z, axial direction.

DETAILED DESCRIPTION

Below, embodiments of the present disclosure will be further described in detail with reference to the drawings and embodiments. The detailed description of the embodiments and the accompanying drawings are intended to exemplary illustrate the principles of the present disclosure and are not intended to limit the scope of the present disclosure. That is, the present disclosure is not limited to the described embodiments.

In the description of the present disclosure, it should be noted that, unless otherwise stated, the meaning of "a plurality" is two or more; the orientation or positional relationship indicated by the terms "upper", "lower", "left", "right" and the like is merely for the purpose of describing the present disclosure and simplifying the description, and is not intended to indicate or imply that the device or component referred to has a particular orientation, is constructed and operated in a particular orientation, and therefore cannot be understood to be a limitation of the present disclosure. Moreover, the terms "first", "second", "third", "fourth" and the like are used for descriptive purposes only and are not to be construed as indicating or implying relative importance.

In the description of the present disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the present disclosure can be understood by the person skilled in the art according to actual circumstance.

For better understanding the present disclosure, a secondary battery 10 and a battery module 20 according to embodiments of the present disclosure will be described in detail below by reference to FIG. 1 to FIG. 7.

As shown in FIG. 1, the embodiments of the present disclosure further provide a battery module 20, comprising two or more secondary batteries 10 according to the present embodiment and a busbar for connecting two of the secondary batteries 10. The two or more secondary batteries 10 are arranged side by side in one direction. One end of the busbar is fixedly connected to one of two secondary batteries 10, and the other end of the busbar is fixedly connected to the other one of the two secondary batteries 10. The two or more secondary batteries 10 of the present embodiment are arranged side by side in their thickness direction Y to form the battery module 20.

Figure 2:
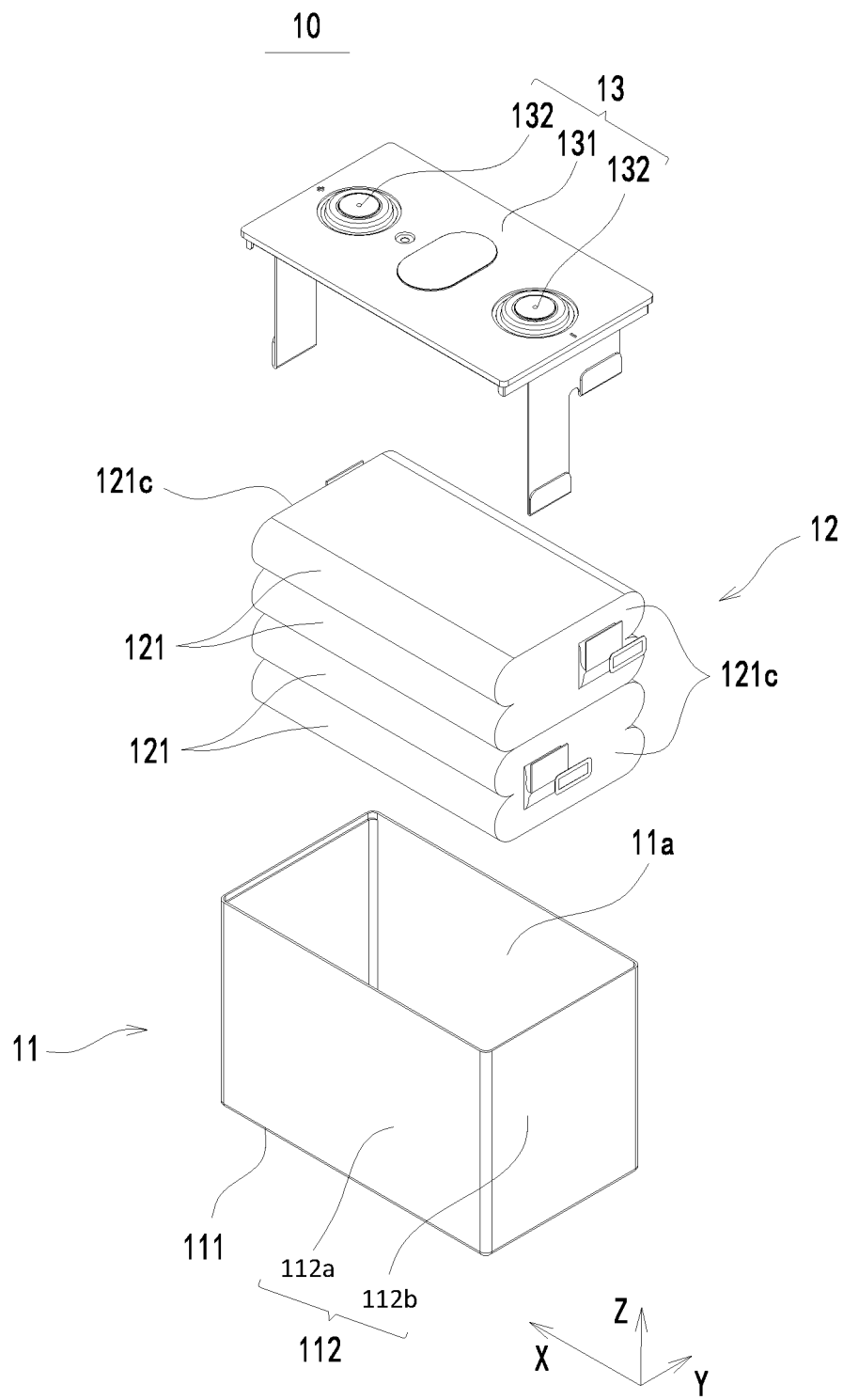
FIG. 2 is a schematic exploded diagram showing a configuration of a secondary battery according to an embodiment of the present disclosure.

Referring to FIG. 2, the secondary battery 10 according to the embodiment of the present disclosure includes a case 11, an electrode assembly 12 disposed in the case 11, and a cap assembly 13 that is sealingly connected with the case 11.

Figure 4:
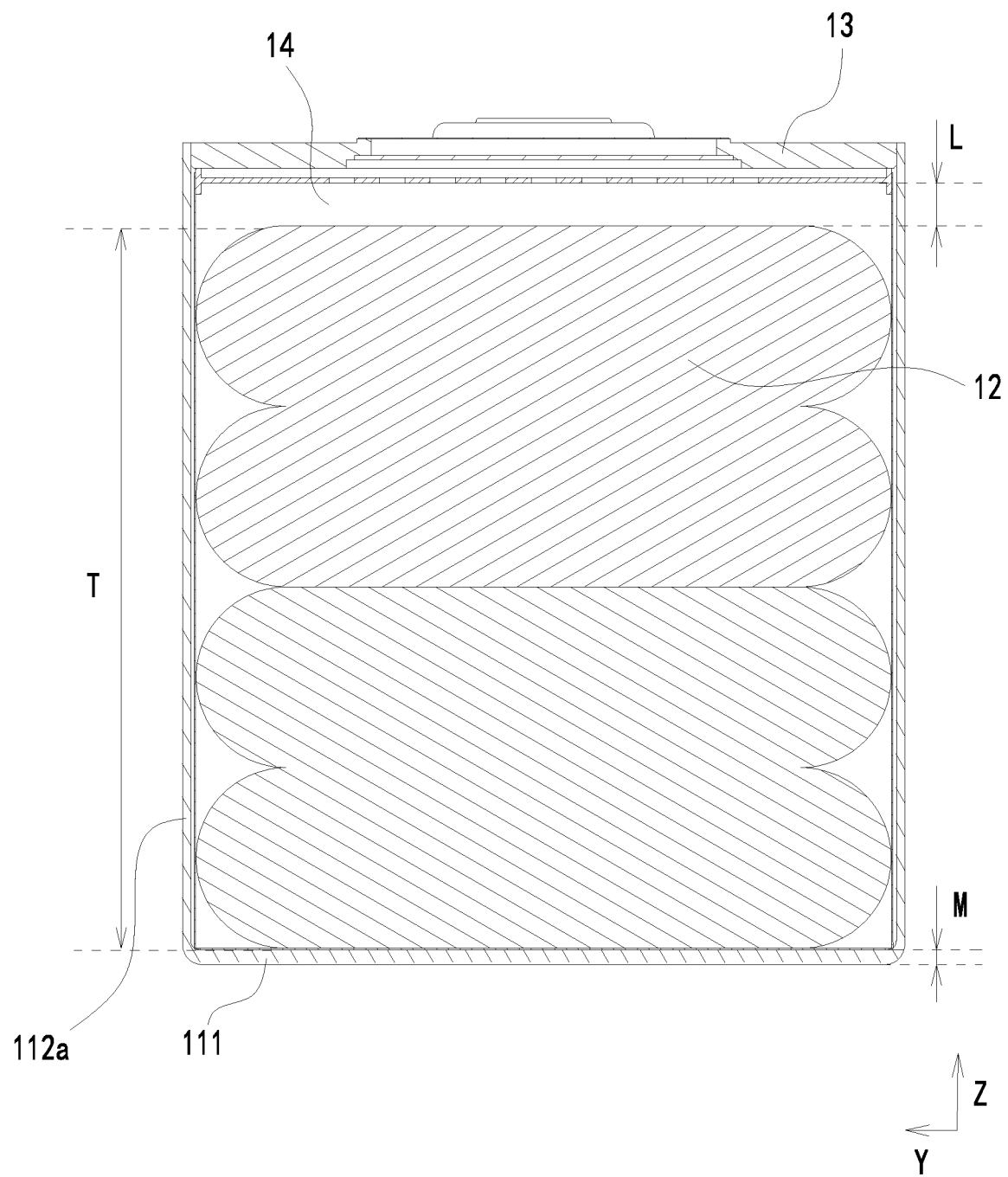
FIG. 4 is a cross-sectional view showing a configuration of a secondary battery according to an embodiment of the present disclosure.

The case 11 of the present embodiment may be formed in a shape of quadrangular prism or in other shapes. The case 11 has an internal space for accommodating the electrode assembly 12 and electrolyte. The case 11 can be made of a material such as aluminum, aluminum alloy and plastic. The case 11 includes a base plate 111 and a side plate 112 connected to the base plate 111. The base plate 111 and the side plate 112 form a receiving hole 11a and an opening in communication with the receiving hole 11a. The opening is arranged opposite to the base plate 111 in an axial direction Z of the receiving hole 11a, wherein the axial direction Z of the receiving hole 11a is parallel to an extending direction of the receiving hole 11a. The base plate 111 has a thickness M (as shown in FIG. 4) larger than a thickness of the side plate 112. The electrode assembly 12 is disposed in the receiving hole 11a. The cap assembly 13 can be sealingly connected to the side plate 112 to close the opening and seal the electrode assembly 12 within the case 11. In one example, the cap assembly 13 includes a cap plate 131 and electrode terminals 132, both of which are located on one side relative to the electrode assembly 12 in the axial direction Z. The cap assembly 13 is sealingly connected to the case 11 by the cap plate 131. The electrode terminals 132 are disposed on the cap plate 131 and are electrically connected to the electrode assembly 12.

Figure 3:
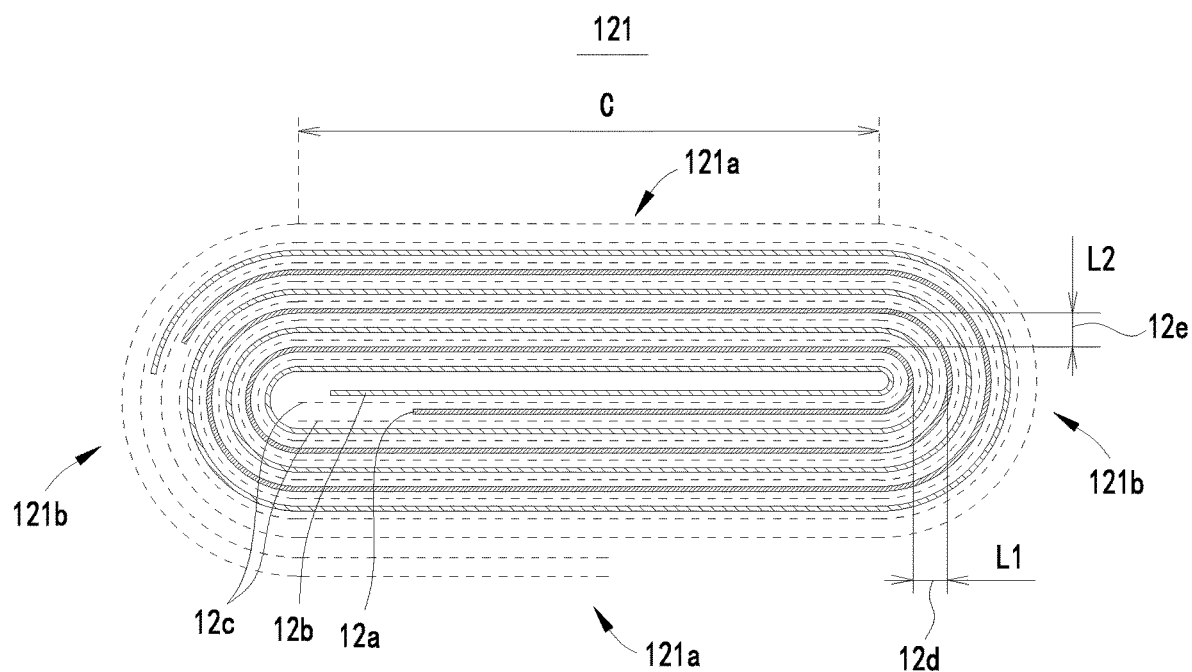
FIG. 3 is a schematic diagram showing a configuration of an electrode unit according to an embodiment of the present disclosure.

Referring to FIG. 3, an electrode unit 121 is formed by winding a first electrode plate 12a, a second electrode plate 12b, and a separator 12c. The electrode unit 121 is formed as a flat member. The electrode unit 121 has a wide side 121a and a narrow side 121b. The electrode assembly 12 of the present embodiment includes two or more electrode units 121, which are stacked in the axial direction Z of the receiving hole 11a, and each of which is arranged with the wide side 121a corresponding to the base plate 111, and with the narrow side 121b towards the side plate 112. The axial direction Z of the receiving hole 11a intersects with the thickness direction Y of the secondary battery 10. The electrode unit 121 includes a body portion and a tab. The separator 12c is an insulator interposed between the first electrode plate 12a and the second electrode plate 12b. The electrode unit 121 of the present embodiment is formed by winding the separator 12c, the first electrode plate 12a and the second electrode plate 12b. In the present embodiment, the description is made by exemplarily taking the first electrode plate 12a as a positive electrode plate and taking the second electrode plate 12b as a negative electrode plate. In other embodiments, the first electrode plate 12a may be a negative electrode plate while the second electrode plate 12b is a positive electrode plate. Further, a positive active material is coated on a region for coating of the positive electrode plate, while a negative active material is coated on a region for coating of the negative electrode plate. A plurality of uncoated regions extending from the body portion serve as the tab. The electrode unit 121 includes two tabs, a positive tab and a negative tab, the positive tab extends from the coated region of the positive electrode plate, and the negative tab extends from the coated region of the negative electrode plate. During an infiltration of the electrolyte in the production or later use of the secondary battery 10, the active material coating included in the electrode unit 121 of the present embodiment will expand, causing an expansion of the entire electrode unit 121. Alternatively, the electrode unit of the present embodiment has a capacity of 100 Ah to 180 Ah.

The secondary battery 10 according to the embodiment of the present disclosure includes the case 11 having the receiving hole 11a, and the electrode assembly 12 disposed in the receiving hole 11a. When expanding, the electrode unit 121 of the present embodiment expands primarily in the axial direction Z of the receiving hole 11a, and thus can release an expansion force in the axial direction Z of the receiving hole 11a, with a relatively small expansion force released in the thickness direction Y. As a result, the electrode unit 121 will not exert an excessive compressive force on the side plate 112 of the case 11. In this way, in the case that the two or more secondary batteries 10 of the present embodiment are arranged side by side in their thickness direction Y to form the battery module 20, the main expansion force generated by the expansion of each secondary battery 10 will not accumulate and thus form a relatively large combined force in the thickness direction Y, since the main expansion force generated by each secondary battery 10 intersects with the thickness direction Y. Therefore, when the battery module 20 including two or more secondary batteries 10 of the present embodiment is fixed by using an external fixing member, the requirements on rigidity and strength of the fixing member can be reduced, which is conducive to reduce a volume or weight of the fixing member, and further is conducive to increase energy density and space utilization of the secondary battery 10 and the entire battery module 20.

In the case that the electrode unit 121 according to the embodiment of the present disclosure expands without being restrained by the case 11, the electrode unit 121 has different expansion amounts on the wide side 121a and the narrow side 121b, and specifically has a larger expansion amount on the wide side 121a than on the narrow side 121b. However, in the case that the electrode unit 121 is loaded into the case 11 with the base plate 111 of the case 11 of the present embodiment corresponding to the wide side 121a of the electrode unit 121 and with the side plate 112 of the case 11 corresponding to the narrow side 121b of the electrode unit 121, the expansion of the electrode unit 121 can be restrained by the case 11, resulting in that a stress in the base plate 111 caused by the wide side 121a of the electrode unit 121 is greater than a stress in the side plate 112 caused by the narrow side 121b. Since the thickness of the base plate 111 is larger than that of the side plate 112 in the present embodiment, the base plate 111 has a smaller deformation amount compared to the side plate 112, which can limit the expansion amount of the electrode unit 121, thereby reducing differences of expansion degree among various regions of the wide side 121a and the narrow side 121b. This is conducive to ensure infiltration uniformity among various regions of the electrode unit 121, and effectively improve infiltration effect and thus electrical performance of the secondary battery 10.

A ratio of a width C (as shown in FIG. 3) of the wide side 121a of the electrode unit 121 of the present embodiment to the thickness M of the base plate 111 is equal to or greater than 20 and equal to or less than 69. After expansion of the electrode unit 121, the wide side 121a of the electrode unit 121 will bulge in the axial direction Z of the receiving hole 11a and thus has a certain curvature. In the case of C/M>69, the width C of the wide side 121a is relatively large, which means, in the case that the thickness of the electrode unit 121 keeps constant, a force exerted on the base plate 111 by the wide side 121a of the electrode unit 121 is larger when the electrode unit 121 expands. Meanwhile, since the thickness of the base plate 11 is relatively small, the base plate 111 cannot effectively constrain the wide side 121a, thereby causing a larger deformation degree of the base plate 111 and a larger expansion amount of the electrode unit 121. As a result, the first electrode plate 12a or 12b of the electrode unit 121 at the outmost layer may be broken due to stress concentration. In the case of C/M<20, the thickness M of the base plate 111 is relatively large and thus it is not easy for the base plate 111 to deform. In this case, although the base plate 111 can provide a constraint to the wide side 121a, the base plate 111 exerts a larger reaction force on the wide side 121a at the same time. Meanwhile, the width C of the wide side 121a is relatively small, which means, in the case that the thickness of the electrode unit 121 keeps constant, a bound tensile force exerted by the narrow side 121b of the electrode unit 121 on the wide side 121a has a larger component in the thickness direction Y. As a result, gaps between the first electrode plate 12a, the second electrode plate 12b, and the separator 12c included in the electrode unit 121 becomes smaller, causing the electrolyte in the gaps between the first electrode plate 12a, the second electrode plate 12b, and the separator 12c corresponding to the wide side 121a to be squeezed out, even causing the electrolyte to be completely squeezed out of the gaps and easy occurrence of lithium plating in severe cases. When the ratio of the width C of the wide side 121a of the electrode unit 121 to the thickness M of the base plate 111 is equal to or greater than 20 and equal to or less than 69, the expansion amount of the electrode unit 121 and the infiltration effect of the electrode unit 121 can be balanced, thereby improving the electrical performance of the secondary battery 10. In one embodiment, the width of the wide side 121a is in a range of 40 mm to 60 mm, and the thickness M of the base plate 111 is in a range of 0.87 mm to 1.8 mm.

The thickness M of the base plate 111 according to the present embodiment is positively correlated with a height T of the electrode assembly 12 (referring to FIG. 4). Here, the positive correlation means that the thickness M of the base plate 111 is directly proportional to the height T of the electrode assembly 12. The greater the thickness M of the base plate 111, the greater the height T of the electrode assembly 12. The less the thickness M of the base plate 111, the less the height T of the electrode assembly 12. Thus, the secondary battery 10 according to the present embodiment can take consideration of requirements on both the energy density and constraint on the expansion force of the electrode unit 121, and can effectively balance the energy density and the constraint on the expansion force.

Referring to FIG. 3, the electrode unit 121 formed by winding in the present embodiment includes multiple layers of the first electrode plates 12a in its radial direction. The first electrode plates 12a in adjacent two layers have a first gap 12d corresponding to the narrow side 121b, and has a second gap 12e corresponding to the wide side 121a. Here, each of a dimension L1 of the first gap 12d and a dimension L2 of the second gap 12e refers to a sum of gaps between the separator 12c and the first electrode plate 12a and gaps between the separator 12c and the second electrode plate 12b. When the active material coated on the first electrode plate 12a or the second electrode plate 12b of the electrode unit 121 expands, each layer of the first electrode plates 12a will displace in the radial direction of the electrode unit 121 due to the expansion force. The first gap 12d and the second gap 12e are each capable of absorbing the displacement amount of each layer of the first electrode plates 12a, and thus can effectively reduce an amount of expansion displacement of the narrow side 121b and the wide side 121a of the electrode unit 121, thereby effectively reducing the expansion force released by the entire electrode unit 121 in various directions. In one embodiment, the dimension L1 of the first gap 12d is greater than the dimension L2 of the second gap 12e, causing that the first gap 12d can absorb the amount of expansion displacement of the first electrode plate 12a to a greater extent compared to the second gap 12e, and thus the narrow side 121b of the electrode unit 121 has a smaller amount of expansion displacement compared to the wide side 121a of the electrode unit 121. In one embodiment, the first gap 12d and the second gap 12e are defined by the same two layers of the first electrode plates 12a. In one embodiment, the first gap 12d has a dimension L1 of 5 μm to 50 μm. If the dimension L1 of the first gap 12d is less than 5 μm, the narrow side 121b of the electrode unit 121 will contact the case 11 earlier when the electrode unit 121 expands, resulting in that the narrow side 121b of the electrode unit 121 will receive a relatively large reaction force when it continues to expand after contacting the case 11. This will further cause the electrolyte in the first gap 12 to be squeezed out, thereby causing that the lithium ion cannot be normally transferred, which adversely affects service life of the secondary battery 10. Meanwhile, since the narrow side 121b of the electrode unit 121 is restrained by the case 11, the expansion force will transfer to the wide side 121a, thereby causing the expansion force to excessively accumulate in the axial direction Z. If the dimension L1 of the first gap 12d is greater than 50 μm, the first gap 12d between the adjacent two layers of the first electrode plates 12a is too large, thereby causing that a transfer time of the lithium ion is too long, which will bring a poor dynamic performance on the narrow side 121b and easy occurrence of lithium plating.

The case 11 according to the present embodiment is preferably made of a metal material. The side plate 112 includes two first plates 112a disposed opposite to each other in the thickness direction Y of the secondary battery 10 and two second plates 112b for connecting the two first plates 112a. The first plates 112a and the second plates 112b are alternately arranged to form a cylinder member having a rectangular cross section. The base plate 111 is formed as a plate-like member in a rectangular shape and is sealingly connected to the first plates 112a and the second plates 112b. The first plates 112a are disposed corresponding to the narrow side 121b of the electrode unit 121. The cap assembly 13 is disposed opposite to the base plate 111 in the axial direction Z of the receiving hole 11a. The cap assembly 13 is sealingly connected to the first plates 112a and the second plates 112b. In some particular cases, the narrow side 121b of the electrode unit 121 also may expand, but the expansion amount thereof is relatively small. Thus, a compressive force exerted on the first plate 112*a* by the narrow side 121*b* is relatively small, which means a combined force of the expansion forces from the respective secondary batteries in the thickness direction Y is relatively small. Further, the larger the expansion amount of the electrode unit 121, the less the dimension L1 of the first gap 12*d* and the dimension L2 of the second gap 12*e*. During use, the electrode unit 121 continues to consume its internal electrolyte, and thus it is necessary to continuously replenish the electrolyte from the outside. When the electrode unit 121 expands, the first plate 112*a* will restrain the narrow side 121*b*, causing the first gap 12*d* to become smaller. This will further cause that the electrolyte in the case 11 is difficult to be replenished to an interior of the electrode unit 121 through the first gap 12*d*, thereby adversely affecting the electrical performance of the electrode unit 121. Moreover, when the electrode unit 121 expands, the first electrode plate 12*a* or the second electrode plate 12*b* located at the outermost layer is subjected to a large tensile stress, and thus is easy to be broken. The first plate 112*a* of the present embodiment can restrain the narrow side 121*b* and prevent the expansion amount of the narrow side 121*b* from being excessively large, thereby effectively reducing the possibility of breakage of the first electrode plate 12*a* or the second electrode plate 12*b*.

Figure 5:
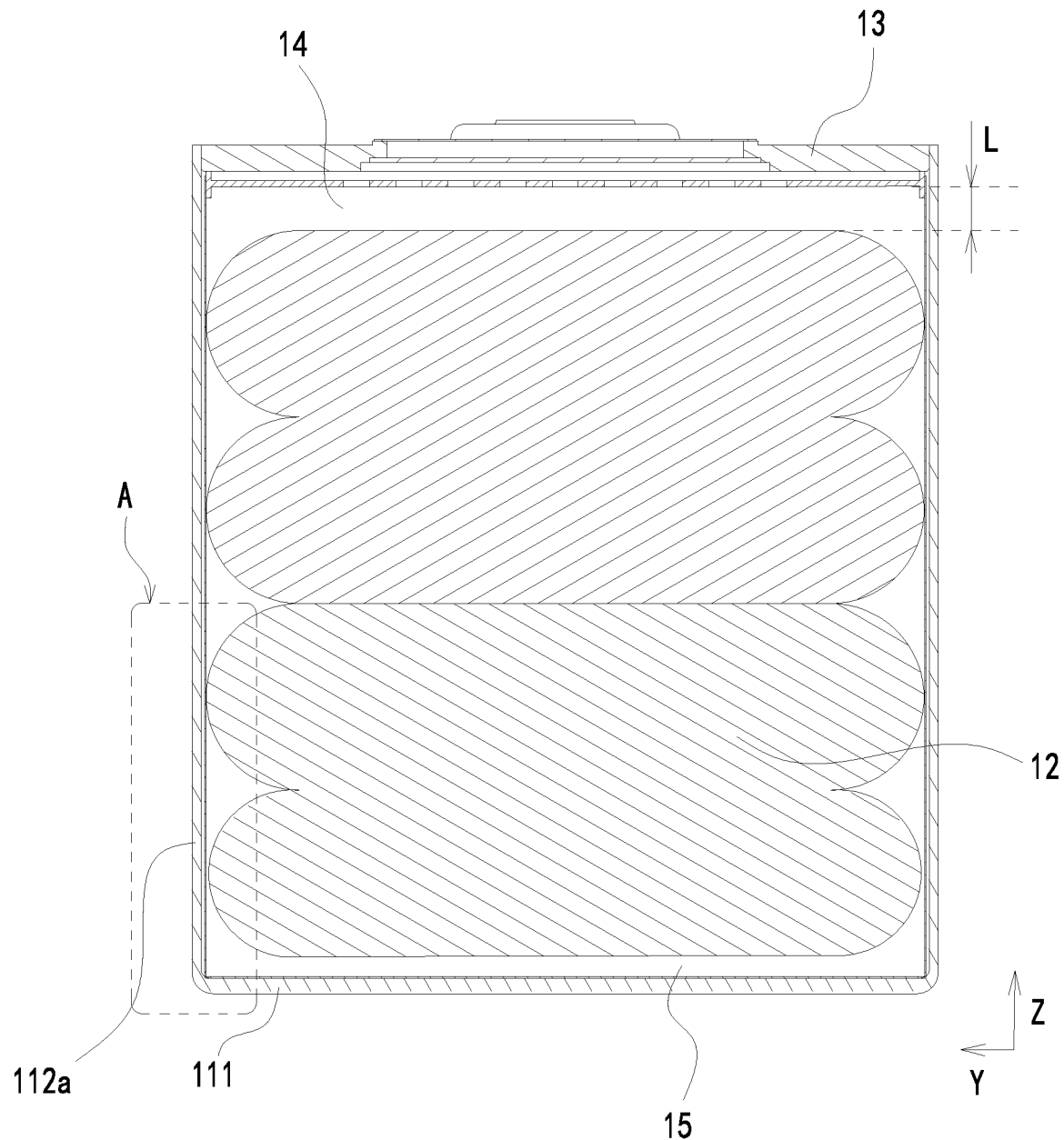
FIG. 5 is a cross-sectional view showing a configuration of a secondary battery according to a further embodiment of the present disclosure.
Figure 6:
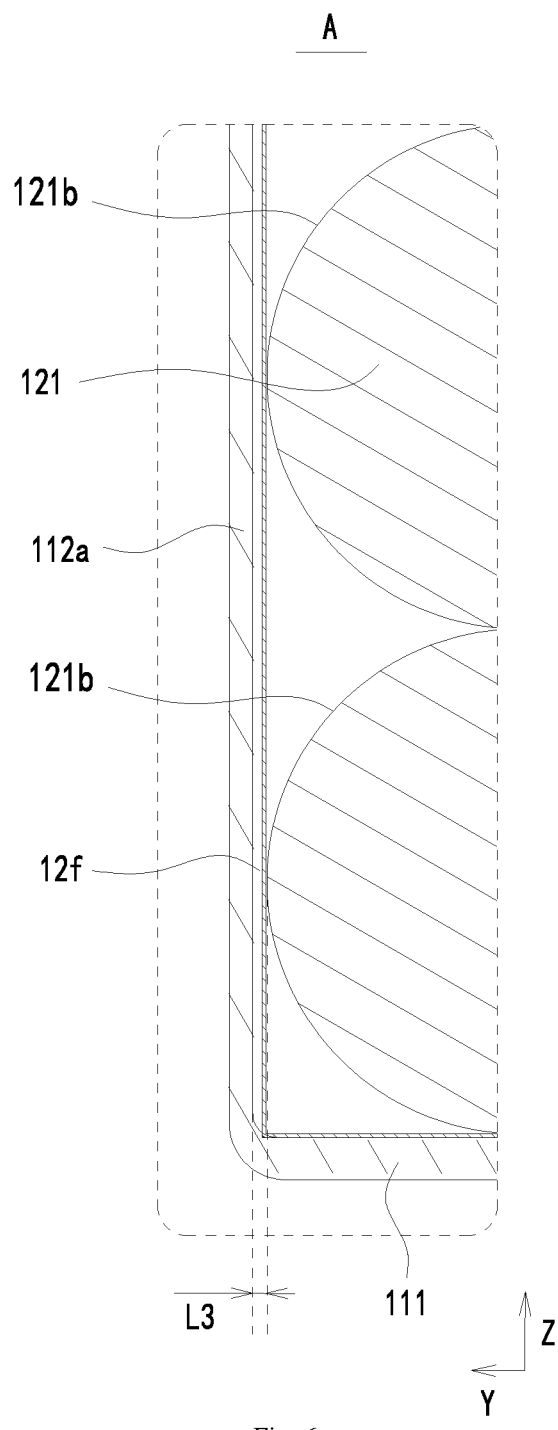
FIG. 6 is an enlarged view of a portion A in FIG. 5.

In one embodiment, referring to FIG. 5 and FIG. 6, a third gap 12*f* is provided between the narrow side 121*b* and the first plate 112*a*, and the third gap 12*f* has a dimension L3 of 0.3 mm to 0.9 mm. In the case that the dimension L3 of the third gap 12*f* is less than 0.3 mm, the narrow side 121*b* of the electrode unit 121 will completely invade the third gap 12*f*, contact the first plate 112*a* and cause a stress in the first plate 112*a*, even when it expands to a small extent. This will cause that an excessive large compressive force is exerted on the first plate 112*a* by the electrode unit 121 when the narrow side 121*b* of the electrode unit 121 reaches the maximum expansion amount, thereby causing deformation of the first plate 112*a* or even deformation of the entire battery module 20 in the thickness direction Y of the secondary battery 10. Meanwhile, the first plate 112*a* will apply a relatively large reaction force to the narrow side 121*b* of the electrode unit 121, thereby causing the first gap 12*d* to be completely occupied and disappear. As a result, the electrolyte cannot be well immersed into the interior of the electrode unit 121 through the first gap 12*d*, adversely affecting the infiltration uniformity of the electrolyte. In the case that the dimension L3 of the third gap 12*f* is greater than 0.9 mm, the narrow side 121*b* of the electrode unit 121 cannot completely invade the third gap 12*f* and contact the first plate 112*a* until it expands to a relatively great extent, thereby causing that the first plate 112*a* cannot effectively constrain the electrode unit 121. This will further cause an excessively large expansion amount of the narrow side 121*b* of the electrode unit 121 when the narrow side 121*b* reaches the maximum expansion amount, thereby causing the first electrode plate 12*a* or the second electrode plate 12*b* at the outermost layer corresponding to the narrow side 121*b* of the electrode unit 121 exhibits stress concentration and has a risk of breaking.

Figure 7:
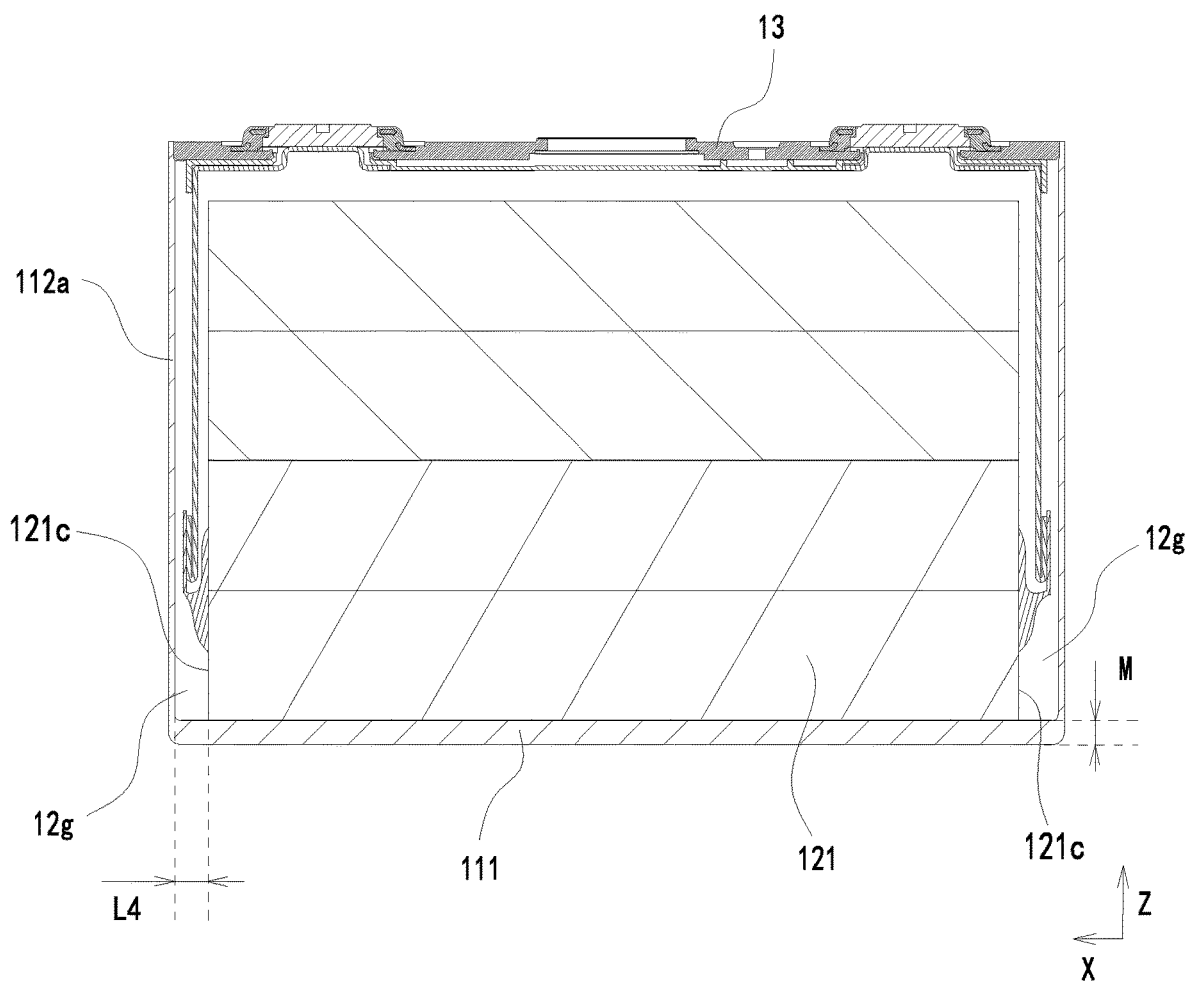
FIG. 7 is a cross-sectional view showing a configuration of a secondary battery according to a further embodiment of the present disclosure.

Referring to FIG. 7, the electrode unit 121 of the present embodiment has two winding end faces 121*c* opposite to each other in a width direction X of the secondary battery, and has a winding axis perpendicular to the winding end faces 121*c*. The second plate 112*b* of the present embodiment is disposed corresponding to the winding end face 121*c* of the electrode unit 121. A thickness of the first plate 112*a* is smaller than that of the second plate 112*b*. In the case that the electrode unit 121 is placed in a high temperature environment, a large amount of high-temperature gas is rapidly generated in the interior of the electrode unit 121. The high-temperature gas inside the electrode unit 121 can be ejected through the winding end face 121*c*, producing an instantaneous high-temperature impact on the second plate 112*b*, which can easily damage or melt the second plate 112*b*. Therefore, it is necessary to appropriately increase the thickness of the second plate 112*b* to enhance strength and rigidity thereof, effectively resist the high-temperature impact, and ensure the safety of the secondary battery 10. The first plate 112*a* and the second plate 112*b* of the present embodiment are particularly designed in their respective configuration depending on their respective positions and functions, which is beneficial to ensure that the entire case 11 is reasonably lightened under the premise of satisfying requirements of use, and thus is beneficial to improve the energy density of the secondary battery 10.

In one embodiment, a fourth gap 12*g* is provided between the winding end face 121*c* and the second plate 112*b*, and the fourth gap 12*g* has a dimension L4 of 0.3 mm to 0.9 mm. The fourth gap 12*g* can provide a buffer for the impact on the second plate 112*b* from the high-temperature gas released from the interior of the electrode unit 121, so as to reduce the possibility of damage or melting of the second plate 112*b*, and improve use safety of the secondary battery 10. In the case that the dimension L4 of the fourth gap 12*g* is less than 0.3 mm, the buffering effect for the high-temperature gas released from the interior of the electrode unit 121 is weakened, and the buffer function cannot be effectively provided. If the dimension L4 of the fourth gap 12*g* is greater than 0.9 mm, the gap between the electrode unit 121 and the second plate 112*b* is too large, thereby causing a larger overall size of the secondary battery 10, which adversely affects the energy density of the secondary battery 10.

Referring to FIG. 4, the cap assembly 13 and the electrode assembly 12 of the present embodiment are spaced apart in the axial direction Z of the receiving hole 11*a* to form a first buffer gap 14. The first buffer gap 14 is used to provide a buffer for the expansion deformation of the electrode assembly 12. In the case that at least one of the electrode units 121 included in the electrode assembly 12 adversely expands, the height of the entire electrode assembly 12 increases. However, since the electrode assembly 12 is restrained by the base plate 111, the electrode assembly 12 mainly expands toward the cap assembly 13. As a result, the expanding electrode assembly 12 will invade the first buffer gap 14 first, but will not directly come into contact the cap assembly 13 and thus exert a compressive force in the cap assembly 13. Therefore, when the electrode assembly 12 expands, the electrode assembly 12 will not exert an excessive compressive force on the cap assembly 13, and thus will not cause the cap assembly 13 to be disconnected from the case 11. Thus, leakage of the electrolyte can be avoided, and structural integrity and safety of the secondary battery 10 can be ensured. In one embodiment, in the axial direction Z of the receiving hole 11*a*, a ratio of a height L of the first buffer gap 14 (a measurement in the axial direction Z of the receiving hole 11*a*) to the height T of the electrode assembly 12 is in a range of 0.05 to 0.3. In the case that the ratio of the height L of the first buffer gap 14 to the height T of the electrode assembly 12 is less than 0.05, the buffering effect of the first buffer gap 14 for the expansion of the electrode assembly 12 is weakened, and the first buffer gap 14 cannot effectively function as a buffer. If the ratio of the height L of the first buffer gap 14 to the height T of the electrode assembly 12 is greater than 0.3, the gap between the electrode assembly 12 and the cap assembly 13 is too large, thereby causing a larger size of the entire secondary battery 10, which will adversely affect the energy density of the secondary battery 10. In one embodiment, the height L of the first buffer gap 14 is in a range of 0.5 mm to 12 mm.

Referring to FIG. 5, the base plate 111 of the case 11 and the electrode assembly 12 of the present embodiment are spaced apart to form a second buffer gap 15. The second buffer gap 15 serves to provide a buffer for the expansion deformation of the electrode assembly 12. When at least one of the electrode units 121 included in the electrode assembly 12 expands adversely, the height of the entire electrode assembly 12 increases. However, since the electrode assembly 12 is restrained by the cap assembly 13, the electrode assembly 12 mainly expands toward the base plate 111. As a result, the expanding electrode assembly 12 will invade the second buffer gap 15 first, but will not directly exert a compressive force on the base plate 111. Therefore, when the electrode assembly 12 expands, the electrode assembly 12 will not exert an excessive compressive force on the base plate 111, and thus will not cause the base plate 111 to be disconnected from the case 11. Thus, leakage of the electrolyte can be avoided, and the structural integrity and safety of the secondary battery 10 can be ensured.

In one embodiment, the cap assembly 13 and the electrode assembly 12 are spaced apart to form a first buffer gap 14, and the base plate 111 of the case 11 and the electrode assembly 12 are spaced apart to form a second buffer gap 15. When at least one of the electrode units 121 included in the electrode assembly 12 adversely expands, the height of the entire electrode assembly 12 increases. The expanding electrode assembly 12 invades the first buffer gap 14 and the second buffer gap 15 first, but will not directly exert a compressive force on the cap assembly 13 or the base plate 111. As a result, the ability of the secondary battery 10 to provide a buffer for the expansion of the electrode assembly 12 in the axial direction Z of the receiving hole 11a can be further improved, thereby improving the structural stability and safety of the secondary battery 10 in the case where the electrode assembly 12 expands.

The battery module 20 according to the above embodiments of the present disclosure includes two or more secondary batteries 10. Two or more secondary batteries 10 are arranged side by side in their thickness direction Y. The electrode units 121 included in each of the secondary batteries 10 are stacked in the axial direction Z of the receiving hole 11a of the case 11. When expanding, the electrode unit 121 of the present embodiment mainly expands and deforms in the axial direction Z of the receiving hole 11a, with a relatively small expansion amount in the thickness direction Y. As a result, the combined force of the expansion forces from the respective secondary batteries 10 in the thickness direction Y is relatively small. Therefore, in the thickness direction Y, the battery module 20 does not need a structural member with a relatively high strength to restrain and offset the expansion force, or merely needs a structural member with a low strength to restrain and offset the expansion force. As a result, a mass of the entire battery module 20 can be effectively reduced, the battery module 20 can have a more compact structure, and the energy density of the battery module 20 can be effectively increased. Meanwhile, since the battery module 20 itself has a small expansion amount or has no expansion in the thickness direction Y of the secondary battery 10, the safety of the battery module 20 during use can be effectively improved.

Although the present disclosure has been described with reference to the preferred embodiments, various modifications may be made to the present disclosure and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A secondary battery, comprising:
a case, comprising a base plate and a side plate connected with the base plate, wherein the base plate and the side plate form a receiving hole and an opening in communication with the receiving hole, the opening is arranged opposite to the base plate in an axial direction of the receiving hole, and the base plate has a thickness larger than that of the side plate;
a cap assembly, sealingly connected with the side plate to close the opening; and
an electrode assembly, disposed in the receiving hole and comprising two or more electrode units, wherein the electrode unit comprises a first electrode plate, a second electrode plate and a separator, and has a wide side and a narrow side, the two or more electrode units are stacked in the axial direction, and each electrode unit is arranged with the wide side corresponding to the base plate and the narrow side toward the side plate;
the side plate comprises two first plates disposed opposite to each other in a thickness direction of the secondary battery and two second plates for connecting the two first plates, wherein the first plate is disposed corresponding to the narrow side, the second plate is disposed corresponding to a winding end face of the electrode unit, and wherein each of the first plates has a thickness smaller than that of each of the second plates.

2. The secondary battery according to claim 1, wherein a ratio of a width of the wide side to the thickness of the base plate is equal to or greater than 20 and equal to or less than 69.

3. The secondary battery according to claim 2, wherein the width of the wide side is in a range of 40 mm to 60 mm, and the thickness of the base plate is in a range of 0.87 mm to 1.8 mm.

4. The secondary battery according to claim 1, wherein the thickness of the base plate is positively correlated with a height of the electrode assembly.

5. The secondary battery according to claim 1, wherein the first electrode plates in adjacent two layers have a first gap corresponding to the narrow side and a second gap corresponding to the wide side, and a dimension of the first gap is greater than that of the second gap.

6. The secondary battery according to claim 1, wherein the first electrode plates in adjacent two layers have a first gap corresponding to the narrow side, and the first gap has a dimension of 5 μm to 50 μm.

7. The secondary battery according to claim 1, wherein a third gap is provided between the narrow side and the first plate, and the third gap has a dimension of 0.3 mm to 0.9 mm.

8. The secondary battery according to claim 1, wherein a fourth gap is provided between the winding end face and the second plate, and the fourth gap has a dimension of 0.3 mm to 0.9 mm.

9. The secondary battery according to claim 1, wherein the cap assembly and the electrode assembly are spaced apart to form a first buffer gap, which is adapted to provide a buffer for expansion deformation of the electrode assembly.

10. The secondary battery according to claim 9, wherein the first buffer gap has a height of 0.5 mm to 12 mm.

11. The secondary battery according to claim 9, wherein in the axial direction, a ratio of the height of the first buffer gap to a height of the electrode assembly is in a range of 0.05 to 0.3.

12. The secondary battery according to claim 1, wherein the base plate and the electrode assembly are spaced apart to form a second buffer gap, which is adapted to provide a buffer for expansion deformation of the electrode assembly.

13. A battery module, comprising two or more secondary batteries according to claim 1, wherein the two or more secondary batteries are arranged side by side.

14. The battery module according to claim 13, wherein a ratio of a width of the wide side to the thickness of the base plate is equal to or greater than 20 and equal to or less than 69.

15. The battery module according to claim 13, wherein the first electrode plates in adjacent two layers have a first gap corresponding to the narrow side and a second gap corresponding to the wide side, and a dimension of the first gap is greater than that of the second gap.

16. The battery module according to claim 13, wherein the first electrode plates in adjacent two layers have a first gap corresponding to the narrow side, and the first gap has a dimension of 5 μm to 50 μm.

17. The battery module according to claim 13, wherein the cap assembly and the electrode assembly are spaced apart to form a first buffer gap, which is adapted to provide a buffer for expansion deformation of the electrode assembly.

* * * * *